June 23, 1942.  W. C. HANSEN  2,287,554
SPEEDOMETER
Filed Oct. 13, 1938
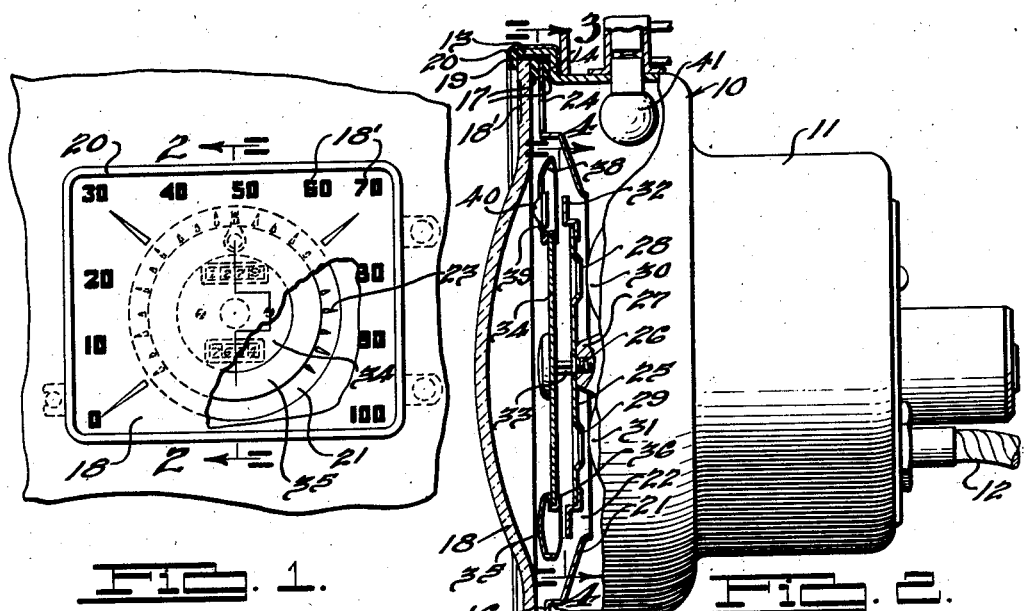
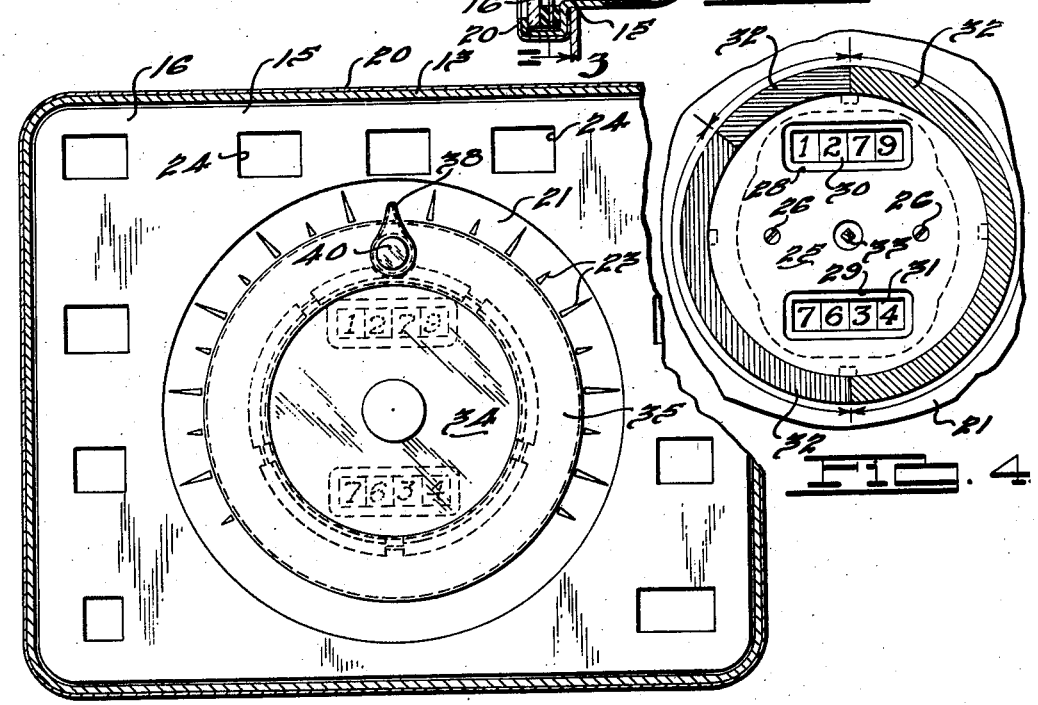
INVENTOR
*Wray C. Hansen.*
BY *Hansen, Lind, Peter & Harris.*
ATTORNEYS Patented June 23, 1942

2,287,554

UNITED STATES PATENT OFFICE 2,287,554

SPEEDOMETER

Wray C. Hansen, Highland Park, Mich., assignor to Chrysler Corporation, Highland Park, Mich., a corporation of Delaware Application October 13, 1938, Serial No. 234,803

6 Claims. (Cl. 116—129)

This invention relates to an improved speedometer.

More particularly, the invention pertains to improvements in speedometer illuminating and speed range color signalling apparatus.

One of the main objects of the invention is the provision of an improved speed range color signalling apparatus in a speedometer which has a stationary color producing element adapted to vary the color displayed by a movable indicator throughout various portions of its course of movement.

Another object of the invention is the provision of an indicating member having a lens piece movable over diverse differently colored sections of a light ray coloring element and which, when illuminated by light rays passing through the differently colored sections of said element, displays the respective colors thereof in an illuminated bead-like fashion.

A further object of the invention is the provision of a lens of this character which is so disposed in close proximity to the arrow-like element of the indicating member as to direct an observer's attention thereto during mere glancing observation of the speedometer dial.

Another object of the invention is the provision of an indicating condensing lens, diverse color signal producing graduation and configuration bearing elements which are adapted to be illuminated by a single light source.

A still further object of the invention is the provision in a speedometer of improved color signalling apparatus which is adapted to reveal to an observer a bead which is differently colored by light rays during diverse speed ranges respectively and which will not produce a blinding or distracting action.

An illustrative embodiment of the invention is shown in the accompanying drawing, in which:

Fig. 1 is a front elevational view of a speedometer embodying the invention.

Fig. 2 is a vertical sectional view taken on the line 2—2 of Fig. 1.

Fig. 3 is a vertical sectional view taken on the line 3—3 of Fig. 2.

Fig. 4 is a fragmentary vertical sectional view taken on the line 4—4 of Fig. 2.

In the form of the invention illustrated in the drawing, the improved speedometer comprises a sheet metal casing, generally designated by the numeral 10, having a compartment 11 in which is confined the conventional speed responsive mechanism and odometer (not shown) with which speedometers of the present construction are conventionally provided. A cable 12 extending into the compartment 11 is provided for operating the speedometer and odometer mechanism. The left extremity of the casing 10, as viewed in Fig. 2, is open and this open extremity is surrounded by a circumferential flange 13 extending leftwardly as viewed in Fig. 2, from a radial flange 14. An indicia bearing element or fixed dial, generally designated by the numeral 15, is mounted in the open extremity of the casing 10. This dial has a radial web portion 16 which is engaged between a pair of yieldable gaskets 17 located adjacent the radial flange 14 of the casing. Adjacent the outer-most gasket 17 is disposed a transparent closure 18 preferably comprising glass or suitable transparent synthetic resins. The transparent closure 18 is held in place by a ring 19 which is engaged by a sheet metal bead 20 clamped over the circumferential flange 13 and having side portions engaging the radial flange 14 and the ring 19. Configurations 18' comprising numerals designating miles per hour are etched in the marginal portions of the transparent closure 18 and preferably rendered opaque in any suitable manner. A light opening 24 is provided in the indicia bearing element 15 in registration with each of the configurations 18' in order to facilitate illumination of the portion of the transparent closure 18 immediately adjacent the configurations.

The fixed indicia bearing element 15 has a frusto-conical portion 21 extending inwardly of the casing 10 at an inclination to the plane of the open extremity thereof. Provided in the frusto-conical portion of the dial member is a central opening 22, preferably of circular shape. Graduation marks 23 are provided on the outer surface of the frusto-conical portion 21.

A disc 25 is rigidly mounted in the casing in fixed position at a location slightly in advance of the opening 22 in the indicia bearing element 21. This disc is supported by screws 26 which are threaded in supports 27 provided in the interior of the casing 10. The disc 25 has sight openings 28 and 29 for accommodating viewing of a total mileage odometer dial 30 and a trip odometer mileage dial 31 respectively. The disc 25 comprises opaque material such as relatively thin sheet metal and it is substantially centrally located with respect to the opening 22. Mounted on the outer edge portions of the opaque disc 25 is a series of transparent or translucent light ray coloring elements 32. Any desired number of differently colored sectors 32 may be employed. In the form shown, there are three differently colored sectors 32, one being red, one green and one amber. The green colored sector is preferably associated with the configurations ranging from 0 to 30 miles per hour, the amber colored sector is associated with the configurations ranging from 30 to 50 miles per hour and the red colored sector is associated with the configurations ranging from 50 to 100 miles per hour.

Mounted on a shaft 33 which is operatively connected with the speed responsive mechanism of the speedometer is a movable indicator comprising a transparent disc 34 which is adapted to rotate with the shaft 33. An opaque ring 35 of slight round bead-like curvature is mounted on the outer edge portions of the transparent disc 34, as illustrated in Fig. 2. The ring 35 preferably comprises sheet metal and is provided at its inner extremity with a channel 36 in which the outer edge portions of the transparent disc 34 are received. The ring 35 also has an outwardly extending pointer 38 which serves as an indicator. Formed in the ring 35 in radial alignment with the pointer 38 is an opening 39 which is registerable with the differently colored transparent sectors 32 during movement of the disc 34 by the speed responsive mechanism. A condensing lens 40 is mounted in the opening 29 to concentrate the diversely colored rays of light and to produce an illuminated bead in close proximity to the pointer which displays the colors corresponding to that of the segment 32 with which it registers.

A light bulb 41 is disposed in the casing 10 which is preferably provided with white light reflecting interior surfaces. The bulb 41 is so positioned as to illuminate the background of the miles per hour configurations 18' and supply light rays which pass through the differently colored segments 32 and then through the condensing lens 40 and to apply light upon the graduations provided on the inclined surface 21 of the indicia bearing element 15. This source of light also sufficiently illuminates the configurations on the odometer dials 30 and 31 to facilitate reading thereof by observation through the transparent disc 34 of the movable indicating member.

During operation of the speedometer, the condensing lens 40 is rotated with respect to the fixed light ray coloring device and in response to the speed responsive mechanism of the speedometer. It is illuminated by light rays of the color of the segment 32 in front of which it is disposed at any instant. Therefore, while the speedometer is indicating a speed of from 0 to 30 miles per hour, the lens 40 shows green. This lens displays an amber coloration when the speedometer is indicating speeds of from 30 to 50 miles per hour and a red coloration when it is indicating a speed of from 50 to 100 miles per hour. Since the light ray coloring member is fixed it may comprise relatively fragile and inexpensive material which readily permits the transmission of light. The color displaying condensing lens is located in close proximity to the pointer of the indicating member and effectively directs an observer's attention to the pointer upon mere glancing observation of the speedometer, thus eliminating the requirement of a brightly lighted speedometer of the type which interferes with a driver's forward vision. The color signalling apparatus enables a driver to conveniently ascertain the range of speed within which he is driving without taking his attention from the road for any appreciable length of time.

Although but one specific embodiment of the invention is herein shown and described, it will be understood that various changes in the size, shape and arrangement of parts may be made without departing from the spirit of the invention.

I claim:

1. In an indicating device having an indicia bearing element; means for producing at any one time mainly only one of a plurality of diverse color signals comprising a movable indicating member having an opaque body portion provided with an indicating configuration in cooperative relation to said indicia bearing element, said indicating member being located in advance of said indicia bearing element, a fixed light ray coloring element having differently colored sections mainly concealed by said indicating member, said indicating member having an opening registerable with said differently colored sections during movement of said member, and a single source of light for projecting light rays through said light ray coloring element and opening and upon said indicia bearing element.

2. An indicating device including a casing having an open extremity, an indicia bearing element located in the marginal portions of the open extremity of said casing provided with inclined surface portions extending inwardly of said casing and comprising opaque material having a circular central opening therein, a rotatable disc located in advance of said opening in said element and having opaque portions extending in light obstructing relation beyond the marginal portions of said element and adapted to be rotated in response to changes in values to be indicated a light ray coloring element fixed in said casing having differently colored translucent sections disposed between said opening of said indicia bearing element and the opaque portions of said disc, said disc having a pointer thereon extending over said indicia bearing element and an opening in said opaque portion adjacent said pointer registerable with the differently colored sections of said light ray coloring element; a transparent closure for said open extremity of said casing having opaque configurations thereon; and a light source for projecting light rays through said differently colored sections, through said opening of said disc and through the marginal portions of said closure and upon said inclined surface portions of said indicia bearing element.

3. An indicating device including a casing having an open extremity, an indicia bearing element located in the marginal portions of the open extremity of said casing having inclined surface portions extending inwardly of said casing and comprising opaque material having a circular central opening therein, a rotatable disc comprising a transparent central portion located in advance of said opening of said element and having an opaque marginal portion extending beyond the edge portion of said opening, said disc being adapted to be rotated in response to changes in values to be indicated, an opaque disc fixed in said casing rearwardly of said movable disc and registering with said opening, said fixed disc having a sight opening therein viewable through the transparent portion of said rotatable disc, a plurality of differently colored translucent sections mounted on the periphery of said fixed disc and registering with the marginal portions of said opening, a pointer on the opaque portion of said rotatable disc extending over said inclined surface portions of said indicia bearing element, the opaque portions of said rotatable disc having an opening therein adjacent said pointer registerable with said differently colored translucent sections during rotation of said last mentioned disc, and means for projecting light rays through said translucent sections opening in said rotatable disc and upon said inclined surface portions as well as through said sight opening of said fixed disc.

4. An indicating device including a casing, an indicia bearing element, a movable indicating member having an opening therein and having opaque portions concealing all portions of the path of said opening with the exception of the portion thereof in instantaneous registration with said opening, a fixed light ray coloring element having differently colored sections concealed by said opaque portions but registerable with and viewable through said opening during movement of said indicating member, a condensing lens in said opening providing the sole outlet for colored lights from said light ray coloring element, and a source of light for projecting light rays through said light ray coloring element and upon said condensing lens.

5. An indicating device including a casing having an open extremity, a transparent closure in said casing having configurations denoting values to be indicated on its marginal portions, an indicating member in said casing adapted to be operated in response to changes of values to be indicated and including an opaque portion having an opening therein, a fixed color screen located in back of said indicating member and having differently colored sections aligned with diverse groups of said configurations respectively, all but the portion of said color screen aligned with said opening being concealed by the opaque portions of said indicating member and means for illuminating the interior of said casing and directing light rays through said sections and said opening.

6. An indicating device including a casing having an open extremity, a transparent closure in said casing having configurations denoting values to be indicated on its marginal portions, an indicating member in said casing adapted to be operated in response to changes of said values including opaque portions having an opening therein, an indicia bearing element having graduations thereon in said casing in back of said indicating member, a fixed color screen located between said opaque portions of said indicating member and said indicia bearing element and having differently colored sections aligned with diverse groups of said configurations respectively and viewable only through said opening of said opaque portions, and means for illuminating the interior of said casing and directing light rays through said sections and said opening and upon said graduations.

WRAY C. HANSEN.